Figure 1:
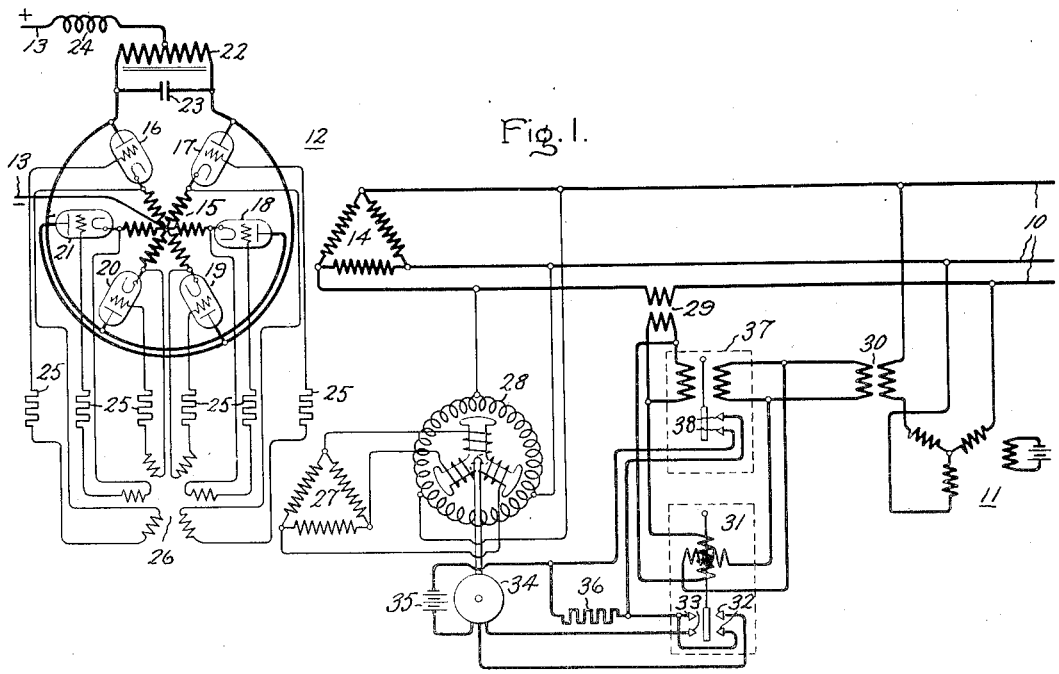

Jan. 16, 1934.  K. KETTNER  1,944,087

SYSTEM OF ELECTRICAL DISTRIBUTION

Filed March 24, 1933

Inventor:
Karl Kettner,
by Charles E. Tullar
His Attorney.

Patented Jan. 16, 1934

1,944,087

UNITED STATES PATENT OFFICE 1,944,087

SYSTEM OF ELECTRICAL DISTRIBUTION

Karl Kettner, Berlin-Lankwitz, Germany, assignor to General Electric Company, a corporation of New York Application March 24, 1933, Serial No. 662,593, and in Germany April 4, 1932

15 Claims. (Cl. 171—119)

My invention relates to systems of electrical distribution, and more particularly to such systems in which an electric valve converting apparatus operates in parallel with a dynamo-electric generator for supplying current to a common load circuit.

When an electric valve converting apparatus is operated in parallel with a dynamo-electric generator supplying a common load circuit, it often becomes desirable to control the output of the converting apparatus in order to maintain a predetermined distribution of current between the converting apparatus and the dynamo-electric machine. For example, there have been developed several types of electric valve converting apparatus suitable for transmitting energy to an alternating current load circuit under reactive power factor conditions, either leading or lagging. It is generally customary to control the output of such converting apparatus by applying alternating potentials to the grids of the several electric valves and shifting the phase of these grid potentials with respect to the potential of the alternating current circuit to vary the power factor of the current supplied by the converting apparatus. When operating such apparatus in parallel with dynamo-electric machines it often becomes desirable to distribute the wattless current drawn by the alternating current load circuit in a predetermined ratio between the converting apparatus and the dynamo-electric machine.

It is an object of my invention, therefore, to provide a new and improved system of electrical distribution including an electric valve converting apparatus and a dynamo-electric generator supplying energy to a common load circuit, in whih an electrical characteristic of the output of the converting apparatus may be controlled jointly in response to the current output of the converting apparatus and that of the dynamo-electric generator.

It is another object of my invention to provide a system of electrical distribution including an electric valve converting apparatus and a dynamo-electric generator operating to supply a common alternating current load circuit, in which the phase of the alternating current supplied by the converting apparatus is controlled jointly in response to the current output of the converting apparatus and the dynamo-electric machine.

It is a further object of my invention to provide a system of electrical distribution including an electric valve converting apparatus operating in parallel with a dynamo-electric generator to supply a common alternating current load circuit, in which the electric valve converting apparatus is controlled jointly in response to the output of the converting apparatus and the generator to maintain a predetermined distribution of the wattless current between the converting apparatus and the generator.

In accordance with one embodiment of my invention, an electric valve inverter, connected to transmit energy from a direct current supply circuit to an alternating current load circuit, operates in parallel on the alternating current circuit with a dynamo-electric generator. The phase relation of the current output of the valve converting apparatus and that of the generator are compared either directly by means of current transformers included in the output circuits of these two apparatus, or indirectly as by comparing the current output of the converting apparatus with the combined output of the converting apparatus and the dynamo-electric generator, that is, the total load current. The comparison of the phase relation of these two currents may be made either through a phase responsive relay or through an auxiliary electric valve control circuit, and this relay, or the control circuit, is effective to actuate a rotary phase shifting transformer from which the grids of the electric valve converting apparatus are excited. With such an arrangement, if the electric valve converting apparatus, for example, tends to supply more or less than its proportionate share of the total reactive current, the relay or the auxiliary valve control circuit will be effective to operate the rotary phase shifting transformer to change the phase relations of the grid potentials of the valve converting apparatus and thus the power factor of the current supplied by it.

In accordance with another feature of my invention, the absolute magnitude of the current of the converting apparatus and the generator are also compared, and in case the difference exceeds a predetermined value, an auxiliary relay is operated to increase the speed of the pilot motor which operates the rotary phase shifting transformer.

Figure 2:
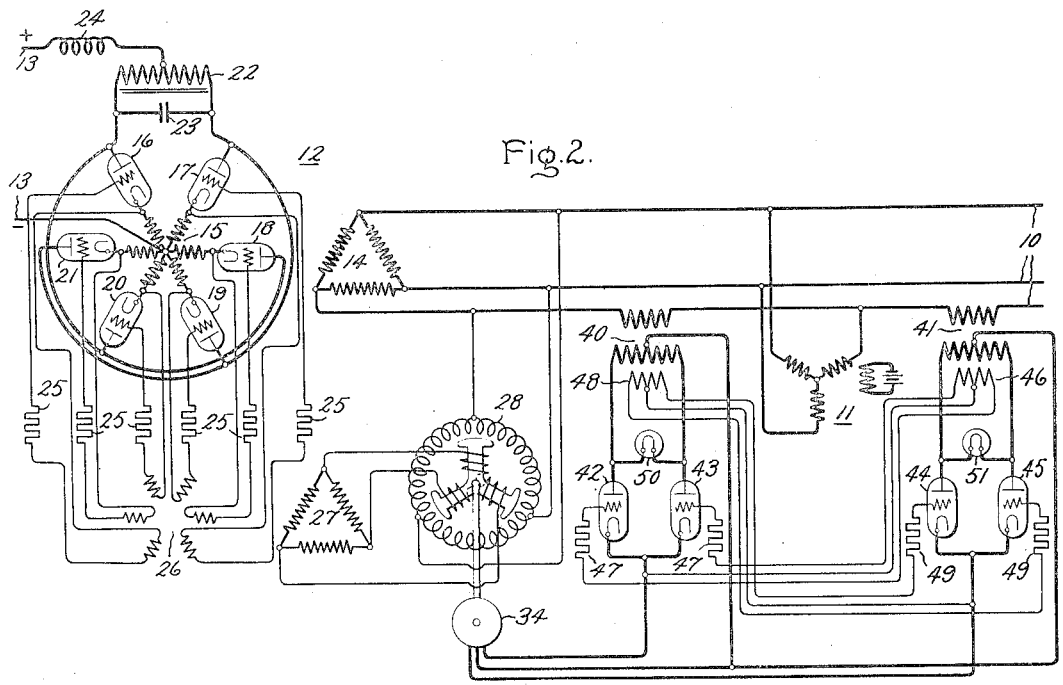

For a better understanding of my invention, together with other and further objects thereof, reference is had to the following description taken in connection with the accompanying drawing, and its scope will be pointed out in the appended claims. In the drawing, Fig. 1 illustrates an embodiment of my invention comprising an electric valve inverter operating in parallel with a dynamo-electric machine for supplying a common three-phase alternating current load circuit in which the current output of the converting apparatus and the generator are compared directly to control the output of the converting apparatus. Fig. 2 illustrates a modification of my invention in which the output of the converting apparatus is compared with that of the dynamo-electric generator indirectly by comparing it with the total output current of the combined apparatus.

Referring now more particularly to Fig. 1 of the drawing, there is illustrated a system of electrical distribution in which a three-phase alternating current load circuit 10 is supplied from a three-phase synchronous generator 11 operating in parallel with a three-phase electric valve inverter 12, which receives its energy from a direct current supply circuit 13. The synchronous generator 11 may be of any of the several conventional types, and hence is illustrated diagrammatically. The electric valve inverting apparatus 12 may be of any of the several well known types capable of supplying reactive alternating current and, as illustrated, includes a polyphase transformer comprising a three-phase secondary network 14 and a six-phase star-connected primary network 15. The negative side of the direct current circuit 13 is connected to the electrical neutral of the network 15, while the positive side of the direct current circuit 13 is connected to alternate phase terminals of the network 15 through the left-hand portion of a commutating transformer 22 and electric valves 16, 18 and 20, and to the other phase terminals of the network 15 through the right-hand portion of the commutating transformer 22 and electric valves 17, 19 and 21. Electric valves 16–21, inc., are each provided with an anode, a cathode, and a control grid, and may be of any of the several types well known in the art, although I prefer to use valves of the vapor electric discharge type. A commutating capacitor 23 is connected across the terminals of the commutating transformer 22, while a smoothing reactor 24 is preferably included in the direct current as illustrated.

It is well understood that the phase of the current transmitted by the electric valve converting apparatus 12 may be controlled by controlling the phase of alternating potentials impressed upon the grids of the several electric valves. This control may be effected by connecting the grids of the several electric valves 16–21, inc., to their respective cathodes through current limiting resistors 25 and the several phase windings of the secondary network 26 of a grid transformer, the primary winding 27 of which is energized from the alternating current circuit 10 through a rotary phase shifting transformer 28. The grid transformer 26—27 is preferably of the self saturating type to supply the grids of the valves 16–21 inc., alternating potentials of peaked wave form, as is well understood by those skilled in the art, although this feature comprises no part of my present invention but is disclosed and broadly claimed in a copending application of B. D. Bedford, Serial No. 485,335, filed September 29, 1930, and assigned to the same assignee as the present application.

In order to control the phase relation of the grid potentials of the valve converting apparatus 12 jointly in response to the output current of the converting apparatus and the dynamo-electric machine, there are provided current transformers 29 and 30 included in the leads of the converting apparatus and the dynamo-electric machine, respectively, and these current transformers energize the operating windings of a phase responsive relay 31, examples of which are well known in the art. The contacts 32 and 33 of the phase responsive relay 31 act as a reversing switch in the circuit of a pilot motor 34 energized from a source of current, illustrated as a battery 35, through a resistor 36 and connected to drive the rotating member of the rotary phase shifting transformer 28, as illustrated.

In case the motor 34 is geared to the rotary phase shifting transformer 28 with such a ratio as to shift the phase of the grid potentials of the valve converting apparatus 12 at a satisfactory rate upon the occurrence of normal changes in the distribution of the wattless current between the two apparatus, it may occur that sudden changes in the distribution of the wattless current occasioned by abnormal conditions on the load circuit 10 may not be corrected sufficiently rapidly. In order to provide against such an occurrence, there may also be provided a differential current relay 37, the contacts 38 of which are arranged to short circuit the resistance 36 in series with the pilot motor 34.

The general principles of operation of the electric valve converting apparatus 12 will be well understood by those skilled in the art. In brief, if electric valve 16 is initially rendered conductive, current will flow from the positive side of the direct current circuit through the left-hand portion of the commutating transformer 22, electric valve 16 and its associated phase winding of the network 15 to the other side of the direct current circuit, inducing an impulse of current in the secondary network 14 connected to the alternating current load circuit 10. The commutating transformer 22 is, in effect, a series auto-transformer and, neglecting its magnetizing current, any current flowing through the left-hand portion must be balanced by an equal and opposite current flowing through the right-hand portion, the only return path for which includes the capacitor 23. In other words, the capacitor 23 is effectively in series with the load current of the apparatus and, during the intervals in which current is flowing in electric valve 16 a potential is produced across the capacitor 23 proportional in magnitude to the load current of the apparatus. This potential is effective, upon the excitation of electric valve 17, to transfer the current from the valve 16 to the valve 17, even though the transfer takes place at a point in the cycle of the alternating potential of the circuit 10 at which the potential of the phase windings of the network 15 interconnecting the valves 16 and 17 opposes such commutation. In this manner, the current is successively transferred between the several electric valves 16–21, inc., inducing an alternating current in the secondary network 14 which is supplied to the load circuit 10. It will be noted that the polarity of the capacitor 23 reverses upon each transfer of current between adjacent electric valves; that is, six times each cycle of alternating current supplied by the apparatus, so that the potential across the capacitor 23 may be referred to as the third harmonic of the alternating potential supplied to the load circuit 10 and the converting apparatus 12 is known as a harmonic commutation inverter.

In explaining the operation of the control apparatus described above, it will be assumed that, initially, the converting apparatus 12 and the synchronous generator 11 are supplying the wattless current of the load circuit 10 in the proper ratio. Under such conditions, if the wattless current drawn by the load circuit 10 increases, the generator 11 will tend to supply the additional wattless current, since the power factor of the current supplied by the converting apparatus 12 is determined by the phase relation of its grid potentials. Therefore, the phase relation of the current supplied by the generator 11 will vary with respect to that of the current supplied by the converting apparatus 12 and the phase responsive relay 31, which compares the phase relation of the currents of these two apparatus, will operate to close its contacts 32 or 33 to operate the pilot motor 34 and thus shift the phase of the grid potentials of the converting apparatus 12 in a proper direction to increase the wattless current output of the converting apparatus. Obviously, upon a decrease in the wattless current drawn by the load circuit 10 the relay 31 will operate its other contacts to reverse the direction of the pilot motor 34 and to produce an opposite corrective effect.

In case the amount of wattless current drawn by the load circuit 10 should change suddenly, due to abnormal load conditions, a very large increase in wattless current supplied by the generator 11 would produce a substantial difference in the absolute magnitude of the currents supplied by the converting apparatus 12 and the generator 11. Upon the occurrence of such a condition, the current differential relay 37 operates to close its contacts 38, which short circuits the resistor 36 in the circuit of the pilot motor 34, and accelerates the operation of the motor 34 in producing the desired corrective effect.

In the arrangement shown in Fig. 2 the comparison between the output current of the valve converting apparatus 12 and the synchronous machine 11 is made indirectly by comparing the current supplied by the converting apparatus 12 with the total load current on the alternating current circuit 10, which is the sum of the other two currents. This control is effected by means of a current transformer 40 included in the output circuit of the converting apparatus 12 and a current transformer 41 included in the main load circuit. A secondary winding of the transformer 40 together with electric valves 42 and 43 comprise a conventional rectifier connected to energize the pilot motor 34 for one direction of rotation, while a secondary winding of the transformer 41, together with electric valves 44 and 45 comprise a second rectifier connected to energize the pilot motor 34 for an opposite direction of rotation. Electric valves 42-45, inc., are each provided with an anode, a cathode, and a control grid, and are also preferably of the vapor electric discharge type. The grids of the electric valves 42 and 43 are energized from an auxiliary secondary winding 46 of the transformer 41 through current limiting resistors 47. Similarly, the grids of the electric valves 44 and 45 are energized from an auxiliary secondary winding 48 of the transformer 40 through current limiting resistors 49. Constant voltage devices, such as the ballast lamps 50 and 51 are connected across the secondary windings of the transformers 40 and 41, respectively, in order that the magnitude of the controlling potential for the pilot motor 34 shall be independent of the magnitude of the current transmitted by the apparatus.

The general principles of operation of the arrangement illustrated in Fig. 2 are similar to those of the arrangement of Fig. 1. As long as the electric valve converting apparatus 12 is carrying its proportionate share of the wattless current drawn by the load circuit 10, the phase of the current delivered by the converting apparatus will be the same as that drawn by the load circuit 10 and, consequently, the same as that delivered by the alternating current generator 11. Under these conditions, the connections of the windings of the transformers 40 and 41 are such that the potentials impressed upon the grids of the valves 42-45, inc., are in phase opposition to their anode potentials and the pilot motor 34 is deenergized. In case the load circuit 10 should tend to draw a larger wattless current lagging, the phase of the current supplied by the transformer 41 will be retarded in phase with respect to that of the transformer 40 or, in other words, the potential supplied by the winding 46 to the grids of the valves 42 and 43 will be retarded in phase by more than 180° with respect to that supplied by the secondary winding of the transformer 41. Electric valves 42 and 43 will become fully conductive to energize the pilot motor 34 to effect the proper correction in the phase of the grid potentials of the valve converting apparatus 12. At the same time, the grid potentials of the valves 44 and 45 will be advanced slightly, but this small angle will be insufficient to allow the rectifier comprising the transformer 41 and the valves 44 and 45 to transmit any appreciable current. Obviously, upon an occurrence of a decrease in a wattless current lagging drawn by the circuit 10 the reverse operation will take place and the grid potentials of the electric valves 44 and 45 will be advanced with respect to their anode potentials and the pilot motor 34 will be energized in an opposite direction.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is,—

1. A system of electrical distribution comprising a load circuit, a first source of electrical energy for said load circuit, a second source of electrical energy, an electric valve converting apparatus for transmitting energy from said second source to said load circuit, said converting apparatus including a plurality of grid controlled electric valves, and means responsive jointly to the currents supplied by said converting apparatus and said first source for controlling the potentials of the grids of said valves to control an electrical characteristic of the output of said converting apparatus.

2. A system of electrical distribution comprising an alternating current load circuit, a dynamo-electric generator for supplying energy to said load circuit, a second source of energy, an electric valve converting apparatus for transmitting energy from said second source to said load circuit, said converting apparatus including a plurality of grid controlled electric valves, and means responsive jointly to the currents transmitted by said converting apparatus and said generator for controlling the potentials of the grids of said valves to control the phase of the current transmitted by said converting apparatus.

3. A system of electrical distribution comprising an alternating current load circuit, a dynamo-electric generator for supplying energy to said load circuit, a second source of energy, an electric valve converting apparatus for transmitting energy from said second source to said load circuit, said converting apparatus including a plurality of grid controlled electric valves, and means responsive to the relative phase of the currents transmitted by said generator and said converting apparatus for controlling the potentials of the grids of said valves to maintain a predetermined distribution of wattless current drawn by said load circuit between said generator and said converting apparatus.

4. A system of electrical distribution comprising an alternating current load circuit, a dynamo-electric generator for supplying energy to said load circuit, a second source of energy, an electric valve converting apparatus for transmitting energy from said second source to said load circuit, said converting apparatus including a plurality of grid controlled electric valves, means for exciting the grids of said valves with alternating potentials, and means responsive jointly to the currents transmitted by said converting apparatus and said generator for varying the phase of said grid potentials to control an electrical characteristic of the output of said converting apparatus.

5. A system of electrical distribution comprising an alternating current load circuit, a dynamo-electric generator for supplying energy to said load circuit, a second source of energy, an electric valve converting apparatus for transmitting energy from said second source to said load circuit, said converting apparatus including a plurality of grid controlled electric valves and means for commutating the current between said valves under reactive power factor conditions on the alternating current circuit, and means responsive jointly to the currents transmitted by said converting apparatus and said generator for controlling the potentials of the grids of said valves to control the phase of the current supplied by said converting apparatus.

6. A system of electrical distribution comprising an alternating current load circuit, a dynamo-electric generator for supplying energy to said load circuit, a second source of energy, an electric valve converting apparatus for transmitting energy from said second source to said load circuit, said converting apparatus including a plurality of grid controlled electric valves and means for commutating the current between said valves under reactive power factor conditions on the alternating current circuit, a rotary phase shifting transformer for exciting the grids of said valves from said alternating current circuit, a reversible pilot motor for operating said transformer, and means responsive jointly to the currents transmitted by said converting apparatus and said generator for controlling said motor to control the phase of the current supplied by said converting apparatus.

7. A system of electrical distribution comprising an alternating current load circuit, a dynamo-electric generator for supplying energy to said load circuit, a second source of energy, an electric valve converting apparatus for transmitting energy from said second source to said load circuit, said converting apparatus including a plurality of grid controlled electric valves, means responsive to the relative phase of the currents transmitted by said generator and said converting apparatus for controlling the potentials of the grids of said valves to control the phase of the current output of said converting apparatus, and means responsive to a predetermined difference in the magnitudes of said currents for accelerating the action of said grid controlling means.

8. A system of electrical distribution comprising an alternating current load circuit, a dynamo-electric generator for supplying energy to said load circuit, a second source of energy, an electric valve converting apparatus for transmitting energy from said second source to said load circuit, said converting apparatus including a plurality of grid controlled electric valves and means for commutating the current between said valves under reactive power factor conditions on the alternating current circuit, a rotary phase shifting transformer for exciting the grids of said valves from said alternating current circuit, a reversible pilot motor for operating said transformer, means responsive to the relative phase of the currents transmitted by said generator and said converting apparatus for controlling said motor to control the phase of the current supplied by said converting apparatus, and means responsive to a predetermined difference in the magnitudes of said currents for increasing the speed of said motor.

9. A system of electrical distribution comprising a load circuit, a first source of electrical energy for said load circuit, a second source of electrical energy, an electric valve converting apparatus for transmitting energy from said second source to said load circuit. Said converting apparatus including a plurality of grid controlled electric valves, separate current responsive means subject respectively to the currents supplied by said first source and by said converting apparatus, and means controlled jointly by said current responsive means for controlling the potentials of the grids of said valves to control an electrical characteristic of the output of said converting apparatus.

10. A system of electrical distribution comprising an alternating current load circuit, a dynamo-electric generator for supplying energy to said load circuit, a second source of energy, an electric valve converting apparatus for transmitting energy from said second source to said load circuit, said converting apparatus including a plurality of grid controlled electric valves, current transformers included in the output circuits of said converting apparatus and said generator, and a phase responsive relay energized from said current transformers and effective to control the potentials of the grids of said valves to control the phase of the current transmitted by said converting apparatus.

11. A system of electrical distribution comprising a load circuit, a first source of electrical energy for said load circuit, a second source of electrical energy, an electric valve converting apparatus for transmitting energy from said second source to said load circuit, said converting apparatus including a plurality of grid controlled electric valves, separate current responsive means subject respectively to the current supplied by said converting apparatus and the current of said load circuit, and means controlled jointly by said current responsive means for controlling the potentials of the grids of said valves to control an electrical characteristic of the output of said converting apparatus.

12. A system of electrical distribution comprising a load circuit, a dynamo-electric generator for supplying energy to said load circuit a second source of energy, an electric valve converting apparatus for transmitting energy from said source to said load circuit, said converting apparatus including a plurality of grid controlled electric valves, a pair of auxiliary grid controlled electric valves, said auxiliary electric valves being energized and controlled jointly by the currents transmitted by said converting apparatus and said generator, and means controlled by said auxiliary valves for controlling the potentials of the grids of the valves of said converting apparatus to control an electrical characteristic of the output thereof.

13. A system of electrical distribution comprising an alternating current load circuit, a dynamo-electric generator for supplying energy to said load circuit, a second source of energy, an electric valve converting apparatus for transmitting energy from said source to said load circuit, said converting apparatus including a plurality of grid controlled electric valves, a pair of current transformers energized respectively from two of the currents of said generator, said converting apparatus and said load circuit, each of said transformers being provided with a pair of secondary windings, a pair of auxiliary valves, each provided with an anode energized from a winding of one of said transformers and a grid energized from a winding of the other transformer, and means controlled jointly by said auxiliary valves for controlling the potentials of the grids of the valves of said converting apparatus to control an electrical characteristic of the output thereof.

14. A system of electrical distribution comprising an alternating current load circuit, a dynamo-electric generator for supplying energy to said load circuit, a second source of energy, an electric valve converting apparatus for transmitting energy from said source to said load circuit, said converting apparatus including a plurality of grid controlled electric valves, a pair of current transformers energized respectively from two of the currents of said generator, said converting apparatus and said load circuit, each of said transformers being provided with a pair of secondary windings, a pair of auxiliary valves, each provided with an anode energized from a winding of one of said transformers and a grid energized from a winding of the other transformer, the connections to said transformer windings being such that the grid and anode potentials of said valves are substantially in phase opposition for a normal distribution of current between said generator and said converting apparatus, and means controlled jointly by said auxiliary valves for controlling the potentials of the grids of the valves of said converting apparatus to control the phase relation of the current thereof.

15. A system of electrical distribution comprising an alternating current load circuit, a dynamo-electric generator for supplying energy to said load circuit, a second source of energy, an electric valve converting apparatus for transmitting energy from said source to said load circuit, said converting apparatus including a plurality of grid controlled electric valves, a pair of current transformers energized respectively from two of the currents of said generator, said converting apparatus and said load circuit, each of said transformers being provided with a pair of secondary windings, a pair of auxiliary valves, each provided with an anode energized from a winding of one of said transformers and a grid energized from a winding of the other transformer, a constant voltage device connected across a secondary winding of each of said transformers, and means controlled jointly by said auxiliary valves for controlling the potentials of the grids of the valves of said converting apparatus to control an electrical characteristic of the output thereof.

KARL KETTNER.

CERTIFICATE OF CORRECTION.

Patent No. 1,944,087.　　　　　　　　　　　　　　　　January 16, 1934.

KARL KETTNER.

It is hereby certified that error appears in the printed specification of the above numbered patent requiring correction as follows: Page 4, line 107, claim 9, after "circuit" strike out the period and word ". Said" and insert instead , said; and that the said Letters Patent should be read with this correction therein that the same may conform to the record of the case in the Patent Office.

Signed and sealed this 20th day of February, A. D. 1934.

F. M. Hopkins (Seal)　　　　　　　　　　　　　　　　　　　　　Acting Commissioner of Patents.